United States Patent
Nijhuis et al.

(10) Patent No.: US 11,542,660 B2
(45) Date of Patent: Jan. 3, 2023

(54) METHOD FOR MANUFACTURING ARAMID PULP COMPRISING PVP

(71) Applicant: TEIJIN ARAMID B.V., Arnhem (NL)

(72) Inventors: Walter Nijhuis, Hengelo (NL); Jan-Cees Tiecken, Didam (NL); Frank Diedering, Deventer (NL)

(73) Assignee: TEIJIN ARAMID B.V., Arnhem (NL)

( * ) Notice: Subject to any disclaimer, the term of this patent is extended or adjusted under 35 U.S.C. 154(b) by 995 days.

(21) Appl. No.: 16/325,597

(22) PCT Filed: Aug. 22, 2017

(86) PCT No.: PCT/EP2017/071156
§ 371 (c)(1),
(2) Date: Feb. 14, 2019

(87) PCT Pub. No.: WO2018/037017
PCT Pub. Date: Mar. 1, 2018

(65) Prior Publication Data
US 2019/0177917 A1    Jun. 13, 2019

(30) Foreign Application Priority Data
Aug. 24, 2016  (EP) .................................. 16185527

(51) Int. Cl.
*D21H 13/26*   (2006.01)
*C08L 77/10*   (2006.01)
*D01F 6/90*    (2006.01)
*D06M 15/59*   (2006.01)

(52) U.S. Cl.
CPC .............. *D21H 13/26* (2013.01); *C08L 77/10* (2013.01); *D01F 6/905* (2013.01); *D06M 15/59* (2013.01)

(58) Field of Classification Search
CPC ..................................................... D21H 13/26
See application file for complete search history.

(56) References Cited

U.S. PATENT DOCUMENTS

| | | | |
|---|---|---|---|
| 5,399,431 A | 3/1995 | Miess et al. | |
| 5,759,348 A * | 6/1998 | Yamabayashi | C08G 59/1427 162/182 |
| 6,303,221 B1 | 10/2001 | Prior et al. | |
| 2003/0180622 A1 * | 9/2003 | Tsukuda | H01G 9/02 429/255 |

FOREIGN PATENT DOCUMENTS

| | | | | |
|---|---|---|---|---|
| CN | 102535241 A | * | 7/2012 | ............. D21H 13/26 |
| KR | 2007072042 A | * | 7/2007 | ............... D01F 1/10 |
| WO | 96/10105 A1 | | 4/1996 | |
| WO | 02/46527 A1 | | 6/2002 | |
| WO | 2014/177328 A1 | | 11/2014 | |

OTHER PUBLICATIONS eHow, How to Convert a Denier to a Micron, Feb. 2012 [downloaded online from archive.org Mar. 10, 2022]. (Year: 2012).*
Dupont, Kevlar Aramid Fiber Technical Guide, 2017. (Year: 2017).*
Smook, Handbook for Pulp and Paper Technologists, 1992, Angus Wilde Publications, 2nd edition, chapter 9 (Year: 1992).*
Sep. 20, 2017 International Search Report issued in International Patent Application No. PCT/EP2017/071156.

* cited by examiner

*Primary Examiner* — Anthony Calandra
(74) *Attorney, Agent, or Firm* — Oliff PLC

(57) ABSTRACT

A process for manufacturing an aramid pulp including polyvinyl pyrrolidone (PVP), the method including the steps of: combining para-aramid short-cut with PVP in an aqueous solution to form a mixture, subjecting the mixture to a refining step to form a para-aramid pulp including PVP. It has been found that the process makes it possible to obtain a PVP pulp with improved dewatering properties and energy consumption in combination with a high PVP retention.

10 Claims, No Drawings

METHOD FOR MANUFACTURING ARAMID PULP COMPRISING PVP

The present invention is directed to a method for manufacturing aramid pulp comprising polyvinyl pyrrolidone (PVP).

Poly(para-phenylene terephthalamide), also indicated as para-aramid, is known in the art for its high strength and fire resistance. Para-aramid pulp can be obtained by fibrillating short para-aramid fibers, also known as para-aramid short-cut. Para-aramid pulp is used in many applications where high strength and high heat resistance are required.

To address specific requirements, modified aramid pulps have been described in the art.

WO02/46527 describes a pulp manufacturing process wherein a blend of polymer materials is spun to form a fiber, floc is cut from the fibers and the floc is refined to form pulp. WO96/10105 describes a process for manufacturing a fibrous pulp of a combination of para-aramid and PVP wherein a para-aramid polymerization reaction is carried out in the presence of PVP, and pulp is prepared from the solution.

U.S. Pat. No. 5,399,431 describes fiber materials from homogeneous blends of aromatic polyamides and PVP. The term homogeneous blends means that the components of the blend form an essentially uniform phase. The fiber materials are obtained by spinning (solutions of) the polymer blends. Pulp is mentioned as a possible use.

U.S. Pat. No. 6,303,221 describes a high modulus elastomer composite comprising a fibrous pulp with is a uniform combination of, preferably para-aramid, and a further polymer such as PVP. The pulp is obtained by refining floc obtained by cutting fibers spun from a blend of component polymer materials.

Thus, in the art, aramid pulp comprising PVP has been obtained either from a solution comprising para-aramid and PVP, wherein the para-aramid may be polymerized in the presence of the PVP, or by fibrillating fibers obtained from homogeneous blends of para-aramid and PVP. These processes have been found to result in pulp with attractive properties. However, there is need in the art for an improved process, in particular a process wherein a pulp with better dewatering properties is obtained, while maintaining good retention of PVP. Additionally, the processes described above have the disadvantage that they make use of relatively complex solutions, and are relatively complicated to integrate into existing para-aramid production.

There is need in the art for a process for manufacturing aramid pulp comprising PVP which on the one hand results in a pulp of good quality, with improved dewatering characteristics while maintaining good retention of PVP, and on the other hand is easy to operate.

The present invention provides such a process.

The invention thus pertains to a process for manufacturing an aramid pulp comprising polyvinyl pyrrolidone (PVP), the method comprising the steps of
combining para-aramid short-cut with PVP in an aqueous solution to form a mixture,
subjecting the mixture to a refining step to form a para-aramid pulp comprising PVP.

It has been found that the process according to the invention makes it possible to obtain aramid pulp comprising PVP in an efficient manner using an easy to operate process, namely without having to use the complicated process for manufacturing PVP-containing yarn. This is surprising since PVP has a high solubility in water. It would therefore be expected that a substantial amount of PVP would be lost during the refining process. This appears not to be the case. Interestingly, when PVP is added to an already existing pulp, PVP loss does take place.

It has further been found that, at a certain fiber length, the PVP pulp prepared by the process according to the invention shows better dewatering properties (i.e. faster dewatering) than PVP pulp obtained from PVP-containing yarn at the same fiber length. This is attractive from a manufacturing point of view, and for use of the pulp in specific applications.

It has further been found that refining of aramid pulp to a certain fiber length in the presence of PVP requires less energy than refining short-cut derived from an aramid-PVP blend yarn.

Further advantages of the present invention and specific embodiments thereof will become clear from the further specification.

The invention will be elucidated further below.

In the context of the present specification aramid refers to an aromatic polyamide which is a condensation polymer of aromatic diamine and aromatic dicarboxylic acid halide. Aramids may exist in the meta- and para-form. Para-aramid is used in the present invention. In the context of the present specification the term para-aramid refers to aramid wherein at least 85% of the bonds between the aromatic moieties are para-aramid bonds. As typical members of this group are mentioned poly(paraphenylene terephthalamide), poly(4,4'-benzanilide terephthalamide), poly(paraphenylene-4,4'-biphenylenedicarboxylic acid amide) and poly (paraphenylene-2,6-naphthalenedicarboxylic acid amide or copoly (para-phenylene/3,4'-dioxydiphenylene terephthalamide). The use of para-aramid wherein at least 90%, more in particular at least 95%, of the bonds between the aromatic moieties are para-aramid bonds is considered preferred. The use of poly(paraphenylene terephthalamide), also indicated as PPTA, is particularly preferred.

Within the present specification the term para-aramid short-cut refers to para-aramid fibers cut to a length of, e.g., at least 0.5 mm, in particular at least 1 mm, more in particular at least 2 mm, in some embodiments at least 3 mm. The length generally is at most 20 mm, in particular at most 10 mm, more in particular at most 8 mm. The thickness of the short-cut is, e.g., in the range of 5-50 micron, preferably in the range of 5-25 micron, most preferably in the range of 6-18 micron. Para-aramid fibers from which such short-cut can be prepared are commercially available, e.g., from Teijin Aramid®. The length of the shortcut refers to the LL0.25, which is a length-weighted average length wherein particles are included having a length >250 µm, i.e. >0.25 mm.

PVP, polyvinyl pyrrolidone, is known in the art and commercially available. It may, e.g., have been obtained by linear polymerization of N-vinyl-2-pyrrolidone. The PVP used in the present invention generally has a weight average molecular weight in the range of 5 to 2500 kg/mol. It may be preferred for the PVP to have a weight average molecular weight of 8 to 1500 kg/mol. Lower molecular weights may be preferred, in particular to obtain improved PVP retention. Therefore, it may be preferred for the PVP to have a weight average molecular weight in the range of 10 to 1000 kg/mol, in particular 10-500 kg/mol, more in particular 10-200 kg/mol, in some embodiments 10-100 kg/mol, or even 10-60 kg/mol.

In the first step of the process according to the invention, para-aramid short-cut is combined with PVP in an aqueous solution to form a mixture. This can be done in a variety of ways. For example, dry short-cut may be added to a solution or suspension of PVP in water, PVP may be added to a suspension of short-cut in water, or PVP and short-cut may be added together to an aqueous medium.

The aramid short-cut generally is present in the mixture in an amount of 0.1-7 wt. %, in particular in the range of 1-5 wt. %. An amount in this range has been found suitable for a successful refining operation.

The concentration of PVP in the mixture depends on the amount of PVP desired in the end product and on the amount of PVP that may be lost during operation. The amount of PVP in the end product generally is in the range of 0.1-10 wt. % PVP, calculated based on aramid dry weight, in particular 0.5-6 wt. %. The amount of PVP present in the aqueous mixture varies between 0.1 and 15 wt. %, calculated based on the dry weight of the aramid short-cut, in particular between 0.5 and 10 wt. %, calculated based on the dry weight of the aramid short-cut.

The aqueous mixture comprising PVP and para-aramid short-cut is subjected to a refining step to form an aramid pulp comprising PVP. Refining processes are known in the art. In general, in refining, a short-cut slurry is subjected to a high shear environment, e.g., by passing it between discs which move with respect to each other. The effect of the refining step is to reduce the length of the short-cut, and to fibrillate the short-cut to form pulp. In fibrillation, fibrils will form on the short-cut, which will result in "stems" with fibrils connected thereto and loose fibrils. Further, the stems of the pulp may become kinked during the refining process.

It is possible to carry out a single refining step, but is also possible to subject refined pulp to one or more further refining steps, which are carried out at the same or different conditions as the first refining step.

The pulp slurry resulting from the refining process may be treated as desired. It can for example be provided to a dewatering step wherein the slurry is dewatered, generally by bringing it onto a sieve or other filtering material. This results in the formation of a dewatered pulp. Dewatered pulp generally has a water content in the range of 40-80 wt. %, specifically 50-70 wt. %. The dewatered pulp can be in the form of a cake (as it originated from the filter), or the cake can be broken to form individual pieces, also indicated as crumb.

The dewatered pulp, in the form of cake or crumb or any other form, can be an end product, which can be further processed as desired. The dewatered pulp can also be dried.

Drying of the dewatered pulp can take place in a conventional manner, e.g. by contacting it with a drying atmosphere, optionally at an elevated temperature, resulting in the formation of dried pulp. Dried pulp generally has a water content in the range of 2 to 20 wt. %, in particular 3 to 10 wt. %.

The dried pulp can, if so desired, be subjected to an opening step. Pulp opening is known in the art. It encompasses subjecting the dried pulp to mechanical impact, e.g., using an impact mill, a mill using turbulent air, or a high shear/high agitating mixer. The pulp opening step decreases the bulk density of the pulp material (i.e., it makes it more "fluffy"). Opened pulp may be easier to disperse and therewith easier to apply. In general, the pulp opening step does not substantially change the properties of the pulp.

The PVP-containing aramid pulp obtained by the method according to the invention generally has a length ($LL_{0.25}$) in the range of 0.7 to 1.5 mm, in particular in the range of 0.9 to 1.5 mm, in some embodiments in the range of 0.9-1.3 mm. This parameter is determined by the Pulp Expert™ FS apparatus which is calibrated with samples of pulp with known lengths. The length weighted length $LL_{0.25}$ [mm] is a length-weighted average length wherein particles are included having a length >250 µm, i.e. >0.25 mm.

The PVP-containing aramid pulp obtained by the method according to the invention generally has a Schopper Riegler (SR) in the range of 15 to 80° SR, in particular in the range of 20 to 60° SR, more in particular in the range of 20 to 40° SR. The SR is a parameter often used in the art of pulp and paper technology. It is a measure of the drainability of a pulp suspension in water. SR can be determined in accordance with ISO5267/1. As indicated above it has been found that the pulp obtained by the process of the invention has better dewatering properties, as evidenced by a lower SR, than a pulp with a comparable length obtained from refining short-cut containing both aramid and PVP (under the same refining conditions).

The PVP-containing aramid pulp generally has a Canadian Standard Freeness (CSF) in the range of 15 to 700 mL, in particular in the range of 100 to 600 mL, more in particular in the range of 270 to 570 mL. The CSF is a parameter often used in the art of pulp and paper technology. It is a measure of the drainability of a pulp suspension in water. CSF can be determined in accordance with TAPPI T227. The improved dewatering properties of the pulp obtained by the process of the invention also appear from a higher CSF as compared with a pulp with a comparable length obtained from refining short-cut containing both aramid and PVP (under the same refining conditions).

As will be evident to the skilled person, the various preferred embodiments as described above can be combined unless they are mutually exclusive.

The invention will be elucidated with reference to the following Examples, without being limited thereto or thereby.

EXAMPLE 1: MANUFACTURE OF PVP-ARAMID PULP ACCORDING TO THE INVENTION 4 kg of para-aramid chopped fibers of 6 mm in length (6 mm short-cut based on Twaron® type 1000 1680f1000 from Teijin Aramid BV, NL) was added to 200 liter of an aqueous solution of PVP. The PVP had a molecular weight of approximately 50 kg/mol. The resulting medium contained 2 wt. % of aramid short-cut and 0.1 wt. % of PVP. The resulting suspension was passed through a Sprout-Bauer 12" lab refiner until the desired fiber length was obtained. Intermediate samples were taken during the process. The refined suspension was dewatered on a sieve table to yield a dewatered cake. The dewatered cake was dried in an oven overnight at 105° C. to yield a dried cake. Approximately 800 g of the dried cake was then opened in a Lödige high-shear mixer for 4 minutes resulting in an opened PVP pulp. The resulting dry pulp contained 5 wt. % PVP, determined from the amount of PVP present in the effluent. The properties of the pulp are discussed in Example 4 below.

EXAMPLE 2: MANUFACTURE OF A COMPARATIVE PULP FROM ARAMID FIBER COMPRISING PVP

The starting material was a para-aramid fiber comprising 5 wt. % of PVP. The fiber was obtained by spinning of aramid in the presence of PVP. The fiber was chopped into short-cut with a length of 6 mm. The short-cut was added to water to form a suspension containing 2 wt. % of aramid-PVP fiber. The suspension was provided to a refiner as described in Example 1, and the resulting refined suspension was treated further as described there. The resulting dry pulp contained 5 wt. % PVP, determined from the amount of PVP present in the effluent. The properties of the pulp are discussed in Example 4 below.

EXAMPLE 3: MANUFACTURE OF A COMPARATIVE PVP-ARAMID PULP BY ADDING PVP TO ARAMID PULP 4 kg of para-aramid chopped fibers of 6 mm in length (6 mm short-cut based on Twaron® type 1000 from Teijin Aramid BV, NL) was added to 200 liter of water. The resulting medium contained 2 wt. % of aramid short-cut. The suspension was passed through a Sprout-Bauer 12" lab refiner as described in Example 1. PVP with a molecular weight of approximately 50 kg/mol was added to the resulting refined pulp suspension in an amount sufficient to obtain a PVP concentration of 0.1 wt. %. The mixture was mixed for 10 minutes and was then dewatered and treated further as described in Example 1. The resulting dry pulp contained 2-4 wt. % PVP, determined from the amount of PVP present in the effluent. The properties of the pulp are discussed in Example 4 below.

EXAMPLE 4: COMPARISON OF PVP-ARAMID PULPS

The following was seen from the manufacture and analysis of the various pulp types.

1. PVP Retention

PVP retention on the pulp was about 100% for the pulp of Example 1 according to the invention and the pulp from blend yarn for Example 2. Where the PVP was added to the pulp after refining (Example 3), only about 80% retention was obtained. These values of retention are based on analysis of the filtrates of the final refined suspension mentioned in examples 1 to 3. The filtrate was obtained by dewatering of the refined suspension on a Büchner funnel. This shows that the process according to the invention makes it possible to incorporate PVP into aramid pulp with low PVP loss, without having to spin the aramid in the presence of PVP, which is a more complicated process.

2. Dewatering

It appeared that the dewatering step for the comparative pulp obtained from the blend yarn (Example 2) took more time than the dewatering step for either the pulp of Example 1, or the comparative pulp with post-added PVP (Example 3), as evidenced by the freeness values in the table below (expressed both in ° SR and mL CSF). A higher SR-value indicates slower dewatering, whereas a higher CSF-value indicates faster dewatering. The following table shows the SR and CSF values for the three types of pulp, normalized to a fiber length of 1 mm.

|  | Freeness [°SR] | CSF [mL] |
| --- | --- | --- |
| Pulp of Example 1 (invention) | 36 | 295 |
| Pulp of Example 2 (comparative) | 69 | 42 |
| Pulp of Example 3 (comparative) | 19 | 584 |

3. Required Energy for Refining

It appeared that the cumulative specific energy (CSE) to reach a certain fiber length is higher for the comparative pulp obtained from the blend yarn (Example 2) than the CSE for either the pulp from Example 1, or the comparative pulp with post-added PVP (Example 3, where the pulp before treatment with PVP is considered), as illustrated in the table below. The table shows the CSE values for the three types of pulp, normalized to a fiber length of 1 mm. This shows that it is less energy efficient to produce pulp from blend yarn in comparison to the pulp from example 1. In addition, in order to even be able to process the blend yarn mentioned in Example 2, the throughput of the refiner needed to be reduced.

|  | CSE [kJ/kg] |
| --- | --- |
| Pulp of Example 1 (invention) | 3349 |
| Pulp of Example 2 (comparative) | 5965 |
| Pulp of Example 3 (comparative) | 2788 |

In conclusion, the process according to the invention makes it possible to obtain a PVP pulp with improved dewatering properties and energy consumption as compared to pulp obtained from PVP-containing yarn, while maintaining a high PVP retention.

The invention claimed is:

1. A process for manufacturing an aramid pulp comprising polyvinyl pyrrolidone (PVP), the process comprising
    combining an amount of para-aramid short-cut with a separate amount of PVP in an aqueous solution to form a mixture, and
    subjecting the mixture to a refining step to form a para-aramid pulp comprising PVP,
    wherein the para-aramid short-cut has a length in a range of from 0.5 mm to 20 mm, and
    wherein the mixture is formed by adding the amount of para-aramid short-cut and the amount of PVP to an aqueous medium or water sequentially, with either of them added first, or simultaneously.

2. The process according to claim 1, wherein the para-aramid is poly(paraphenylene terephthalamide).

3. The process according to claim 1, wherein the para-aramid short-cut has a thickness in the range of 5-50 micron.

4. The process according to claim 1, wherein the PVP has a weight average molecular weight in the range of 5 to 2500 kg/mol.

5. The process according to claim 1, wherein the amount of the aramid short-cut in the mixture is in the range of 0.1-7 wt. %.

6. The process according to claim 1, wherein the amount of the PVP present in the aqueous mixture varies between 0.1 and 15 wt. %, calculated based on the dry weight of the aramid short-cut.

7. The process according to claim 1, wherein a pulp slurry resulting from the refining step is subjected to a dewatering step, to form a dewatered pulp with a water content which generally is in the range of 40-80 wt. %.

8. The process according to claim 7, wherein the dewatered pulp is subjected to a drying step to form a dried pulp, with a water content which generally is 2 to 20 wt. %.

9. The process according to claim 8, wherein the dried pulp is subjected to an opening step.

10. The process according to claim 1, wherein the PVP is not adhered to the para-aramid short-cut prior to the refining step.

* * * * *